United States Patent
Petervary et al.

(10) Patent No.: US 7,128,532 B2
(45) Date of Patent: Oct. 31, 2006

(54) TRANSPIRATION COOLING SYSTEM

(75) Inventors: Miklos Paul Petervary, Culver City, CA (US); Kevin A Lohner, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 10/624,908

(22) Filed: Jul. 22, 2003

(65) Prior Publication Data

US 2005/0045306 A1 Mar. 3, 2005

(51) Int. Cl.
*F01D 5/18* (2006.01)
*F04D 29/58* (2006.01)

(52) U.S. Cl. .............. 416/97 A; 416/97 R; 416/229 R

(58) Field of Classification Search .............. 416/97 R, 416/96 R, 97 A, 230, 229 R
See application file for complete search history.

(56) References Cited

U.S. PATENT DOCUMENTS

| | | | |
|---|---|---|---|
| 3,864,199 A * | 2/1975 | Meginnis | 428/596 |
| 3,940,532 A | 2/1976 | Smith, II | |
| 4,562,039 A * | 12/1985 | Koehler | 419/2 |
| 5,252,279 A * | 10/1993 | Gore et al. | 264/154 |
| 6,190,602 B1 | 2/2001 | Blaney et al. | |
| 6,418,973 B1 | 7/2002 | Cox et al. | |
| 2003/0052154 A1 | 3/2003 | Marshall et al. | |

FOREIGN PATENT DOCUMENTS

GB 2323056 9/1998

OTHER PUBLICATIONS

U.S. Appl. No. 10/677,817, filed Oct. 2003, Sprouse.
U.S. Appl. No. 10/271,950, filed Oct. 2002, Sprouse et al.
Eric R. Trumbauer, John R. Hellmann, Linda E. Jones, "Oriented Microchannel Membranes Via Oxidation of Carbon-Fiber-Reinforced Glass Composites" Carbon, vol. 30, No. 6, 1992, pp. 873-882.

* cited by examiner

*Primary Examiner*—Edward K. Look
*Assistant Examiner*—Dwayne J White
(74) *Attorney, Agent, or Firm*—Harness Dickey & Pierce P.L.C.

(57) ABSTRACT

A system for cooling a structure or mechanism through transpiration processes. Generally a porous structural material may be used to form a hot wall surface of a high temperature or high heat flux environment component, typically used in combustion type devices. Coolant pressurized on the "cold" or cooler side of the wall is bled, "sweated", or otherwise transpired to the "hot" wall surface in an effort to control the hot wall surface temperature by shielding the surface with a coolant layer at the surface and by removing heat via coolant flow past the surface. This may be done to manage the hot wall temperature for structural purposes, more effectively manage high heat fluxes, or to hide thermal signatures. The porous material can be selectively made such that the coolant material flows substantially in one direction only through the porous material to transfer thermal energy only away from the structure rather than towards the structure.

23 Claims, 4 Drawing Sheets

TRANSPIRATION COOLING SYSTEM

FIELD OF THE INVENTION

The present invention relates generally to cooling systems for transpiration cooling, and particularly to systems and methods of forming selectively porous laminate materials for transpiration cooling.

BACKGROUND OF THE INVENTION

Many materials are known to be porous, generally being inherently porous. The naturally porous materials can be provided as filters or as transpiration coolers for various applications. Nevertheless, many natural materials include a porosity that is also substantially "natural". Simply, the natural porosity of many materials is highly variable. Although porosity for various materials may be within a generally known range, the porosity can be unevenly distributed throughout the material. Moreover, the natural porosity of a selected material may be within a large range rather than within a narrow porosity range. Furthermore, a material having a selected porosity may not include other selected or desirable characteristics, such as strength.

Nevertheless, it is desirable to provide materials that include a selected porosity, and more specifically a porosity that is substantially consistent throughout the material such that natural variations do not occur within the material. Therefore, the porosity will include a selected porosity and pore size. The entire material should have a known physical characteristic and capable of being applied in a substantially consistent manner.

Moreover, most often porous materials include a substantially multi-directional porosity. That is, the porosity is distributed such that flowable materials may move through the pores in both directions, from a first side to a second side and from the second side to the first side of the material. If the porous material is provided as a filter or membrane, a pressure differential across the membrane must be relied upon to move the material in a selected direction. Generally, this requires including additional manufacturing steps or structural elements in the final structure or device.

Therefore, it is also desirable to provide a material that is substantially directionally porous. Simply, a material that includes a porosity that allows material to flow in only one direction relative to the porous material. With a pressure differential supplied across the membrane, the pores of the membrane would allow a flow of material in only one direction. The flow may be dependent upon the material in which the pores are made or the material being flowed across the membrane; nevertheless, the membrane may be substantially uni-directional in its porosity for selected flowable materials.

It is also desired to provide many materials including selected porosities. That is, materials of various types including a selected porosity that include both a selected pore density, selected pore size, and selected directional porosity. Therefore, rather than providing only a single material including a selected porosity with a general technique, the materials could be varied and used in many different applications including different strengths and weight requirements that may be provided by various materials.

Also, it is known to cool various components, such as components of a rocket engine including turbine parts, combustion chambers, and nozzles. Cooling these systems in particularly harsh environments can be difficult due to the high heat flux, strength, and heat resistance needed of the various cooling components. Therefore, providing a cooling system in such an environment is often difficult, heavy, complex, or expensive. In addition, the cooling systems are generally large and bulky due to the requirements for heat transfer and strength in the environment. Therefore, it is also desirable to provide a cooling system that can easily cool a component in a harsh environment without great size or complexity.

SUMMARY OF THE INVENTION

The invention provides a system for providing pores in a structure according to selected properties. Generally a structure, such as a laminate, may be formed with a selected pore according to a selected porosity or other physical attributes. The porosity may be formed by positioning pins or pore forming members through a laminate preform before the preform is processed to form the laminate structure. After forming the laminate structure the pins can be removed according to various processes which do not harm the physical characteristics of the laminate structure. Therefore, the porosity of the final laminate material is provided according to a selected size, direction, distribution, and porosity rather than being generally random according to a natural process.

The invention further provides a system for cooling a component through substantially transpiration processes. A laminate material including required physical characteristics, such as strength or toughness, and including selected pores, is provided adjacent or around the apparatus to be cooled. The selected pores allow for transpiration of a coolant which can be flowed between the porous material and the apparatus to be cooled or the source of the heat flux. The coolant, which is transpirated through the porous member or structure, absorbs thermal energy from the apparatus to be cooled or heat source. This removes thermal energy from the apparatus and allows a selected temperature of the apparatus to be maintained during operation of the apparatus. Therefore, only the coolant material and an area for the coolant material to flow is required between the apparatus and the porous membrane. Thus, a small system is provided for cooling the selected apparatus.

The invention further provides, according to an embodiment a way to cool a structure by transpirating a material through the structure wall. For example, a structural component that is subject to high heat fluxes may include or be formed of a porous material. A coolant may then be provided to flow through the porous material from a coolant source and be evaporated on the hot side of the porous material to cool the porous material, thereby keeping the porous material, which is the structural component, at a selected temperature. This transpiration or "sweat" cooling allows the coolant material to be flowed through the structural component being cooled without requiring additional or bulky components that must be provided to pump or transport a coolant adjacent a structural component to be cooled. Rather, the coolant flows through the structural member to cool it on contact. Also, various cooling conduits, evaporators, and compressors would not be necessary.

Further areas of applicability of the present invention will become apparent from the detailed description provided hereinafter. It should be understood that the detailed description and various examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of various embodiments is merely exemplary in nature and is in no way intended to limit the invention, its application, or uses.

Figure 1:
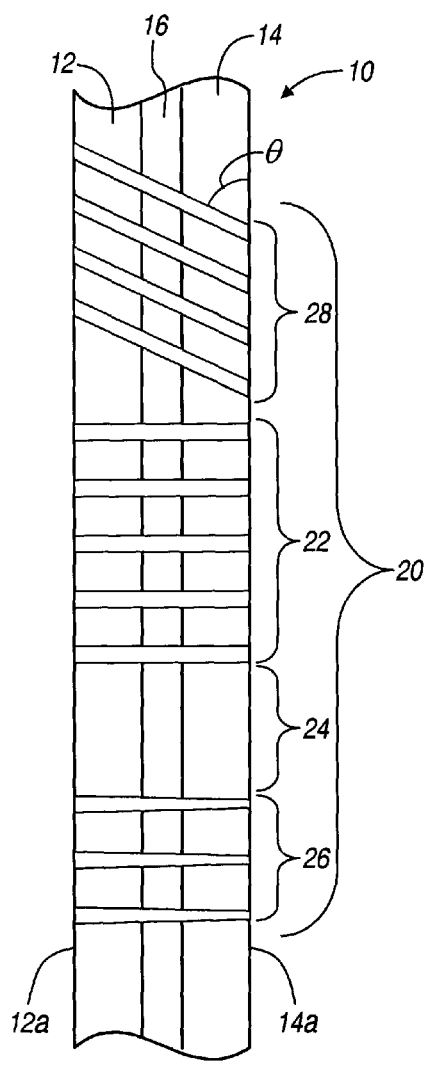
FIG. 1 is a cross-sectional view of a laminate including pores according to an embodiment.

With reference to FIG. 1, a laminated structure 10 includes at least two layers, a first layer 12 and a second layer 14 formed generally adjacent one another. In addition, an intermediate layer 16 may be formed or positioned between the first and second layers 12, 14. The intermediate layer 16 may be used for adhering the first and second layers 12, 14 to one another during a formation or laminating process. Nevertheless, it will be understood that laminated layers may include a pre-impregnated material which can be used to affix the first and second layers 12, 14 together during the formation process. Alternatively, the first and second layers 12, 14 may be fixed to one another, during the formation process, without any additional adhesive material. Also, it will be understood that the laminate structure 10 may include any number of appropriate layers. Simply, only illustrating the first layer 12 affixed to the second layer 14 is for clarity and is merely exemplary and not intended to limit the scope of the present disclosure. Therefore, the laminate structure 10 including any appropriate number greater than the two structural layers 12, 14 and a single intermediate layer 16 may be used.

Formed through the laminate 10 are a plurality of bores or pores 20. The pores 20 can be formed through the laminate 10 in any appropriate or selected manner. Generally, however the pores 20 are formed such that a uniform density or porosity is formed in a selected area such as a first set of pores 22. Moreover, the pores may be formed such that a non-porous area 24 is also formed. Furthermore, the pores 20 may be formed to include desired physical characteristics such as being uni-directional. For example, a plurality of uni-directional pores 26 allow the flow of a flowable material from a first side 12a to a second side 14a. It will be understood that the uni-directional pores 26 may also be formed such that material flows substantially only from the second side 14a to the first side 12a. In addition, due to the formation of the uni-directional pores 26, it may be that the uni-directional pores 26 are positioned in any selected area of the laminate 10 D. The pores 20 may also include an angled pore or pores 28. The angled pores 28 may be formed an any selected angle θ relative to a side 12a or 14a of the laminated structure 10. This allows for a cooling or a flow of material from one selected position to another selected position through the laminate structure 10.

The first laminate layer 12 and the second laminate layer 14 may generally be formed of any appropriate material, for example non-oxide or oxide ceramic matrix composite materials. Alternatively, both the first layer 12 and the second layer 14 may be formed of a silicon carbide material reinforced with carbon fibers and formed in an appropriate manner. As a further example, oxide layers may include alumina or alumina silicates with or without reinforcement fibers such as alumina, sapphire, or quartz. Therefore, it will be understood any appropriate material may be used.

Generally, the first and second layers 12, 14 are formed to include selected physical characteristics, such as strength or durability. In addition, the first and second layers 12, 14 may be formed of a material that includes other physical characteristics such as thermal or electrical conductivity. It will be understood that the layers 12, 14 may be substantially non-porous. Moreover, after the laminate 10 is formed, it may include generally no pores except for the manufactured pores 20. The materials may also be reinforced with various fibers or materials, such as carbon or metal fibers. When the first and second layers 12, 14 are laminated together in the laminate structure 10, the laminate structure 10 includes the selected physical characteristics. The pores 20 formed in the laminate structure 10 are formed without destroying the selected physical characteristics of the laminate structure 10. Physical characteristics may also include inherent strength or toughness of the laminate structure 10 in addition to characteristics of the various layers. Thus the laminate structure 10 may include both selected physical properties and porosity.

Forming the pores 20 through the laminate 10 as the laminate 10 is formed substantially ensures that the porosity or the pores 20 formed in laminate 10 are formed in a selected manner and according to selected requirements. Selectively forming the pores 20 also helps ensure a selected and complete porosity. Also, forming the pores 20 during the manufacturing of the laminate 10 ensures that the formation of the pores 20 or the presence of the pores 20 does not substantially destroy the selected physical or chemical characteristics of the laminate 10. It will be understood a limited amount of degradation may occur but not so much as to significantly affect selected properties of the material overall or the laminate 10.

Figure 2:
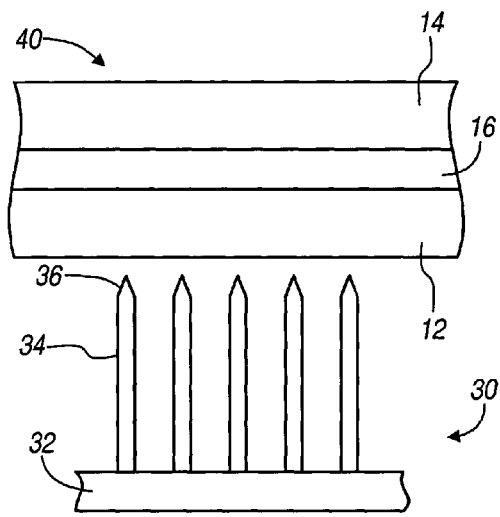
FIG. 2 is an exploded view of the laminate and a pore forming apparatus.

With reference to FIG. 2, the pores 20 (illustrated in FIG. 1) may be formed using a pore forming apparatus 30. The pore forming apparatus 30 generally includes a base 32 and a plurality of pins or pore forming members 34 extending from the base 32. Generally, the pins 34 include a relatively sharpened top or engaging end 36 that is used to pierce a portion of a laminate preform 40. The laminate preform 40 includes each of the layers which will form the laminate structure 10, but which have not been laminated that is the process to make each of the layers 12, 14 substantially coherent has not occurred. The pins 34 pierce the laminate preform 40 to form desired pores in the laminate preform 40 which become the pores 20 once the pins 34 are removed. As the pins 34 pierce the laminate preform 40, they can push aside any reinforcement fibers without substantially breaking or weakening the fibers. The pins 34 allow for the formation of the pores 20 in the laminate structure 10 without substantially weakening any structural properties of the laminate structure 10. In part, this is done by not destroying any reinforcement fibers that are positioned in the laminate perform 40.

Figure 3:
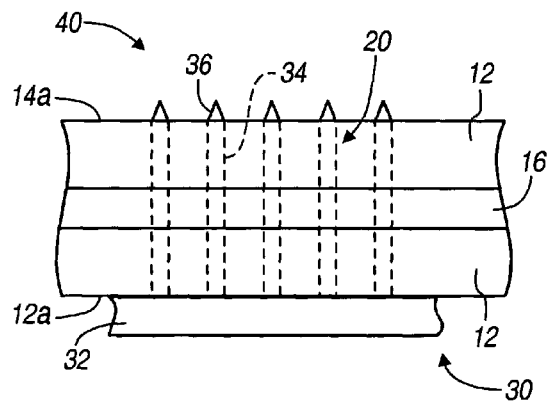
FIG. 3 is an assembled view of a laminate and a pore forming apparatus.

With continued reference to FIG. 2 and additional reference to FIG. 3, the laminate preform 40 is pressed onto the pins 34 a selected distance. Generally, the pins 34 include a height to provide a pore depth of a selected depth through the laminate structure 10. Generally, providing pores through laminate structure 10 is selected such that a flowable material is able to pass from the first side 12a to the second side 14a. The pore forming apparatus 30 can be pressed through the laminate preform 40 or the laminate preform 40 pressed onto the pore forming apparatus 30. Nevertheless, the pins 34 generally engage and pass through selected layers of the laminate preform 40 to form regions that become the pores 20 in the laminate structure 10.

The pins 34 may be formed or placed on the base 32 of the pore forming apparatus 30 in any appropriate shape or pattern. Moreover, the pin forming apparatus 30 may be shaped to any appropriate geometry. In this way as the laminate preform 40 is placed over the pore forming apparatus 30 it conforms to the shape of the pore forming apparatus 30 such that a complimentary shape or a similar shape is formed in the laminate preform 40 as the pores 20 are formed in the laminate preform 40.

Because the pins 34 may be positioned on the base 32 in any appropriate design or pattern, selected porosities or designs of porosities can be formed in the laminate 10. In addition, each of the pins 34 positioned on the base 32 may be of a selected size or geometry. Therefore, a first set of the pins 34 may be a first size, while a second set is a different size. Moreover, the pins 34 may include a selected geometry to create a uni-directional pore, such that the flowable material passes only in one direction, and again only some of the pins placed on the base 32 may include this attribute while others do not.

Figure 4A:
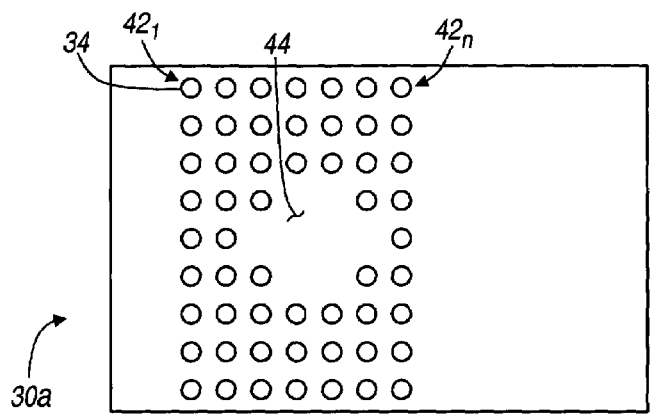
FIG. 4A–4C is a pore forming apparatus according to various embodiments.
Figure 4B:
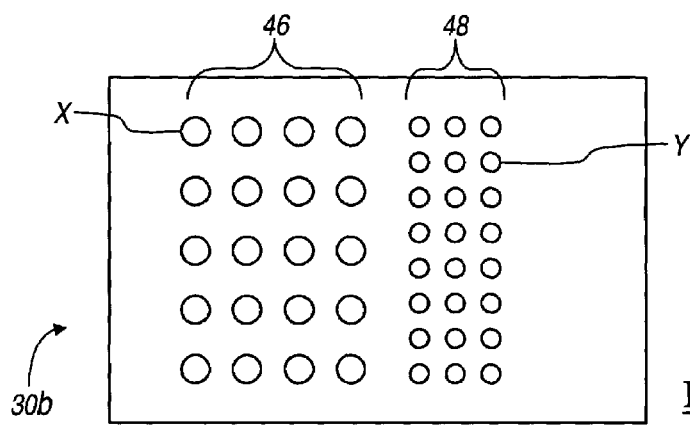
Figure 4C:
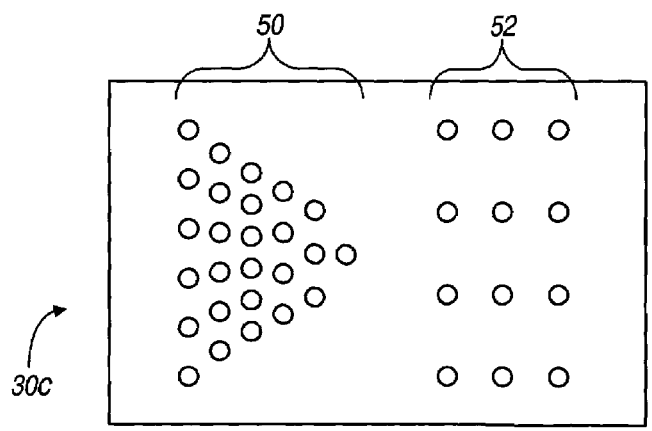

With reference to FIG. 4A to 4C, exemplary pore forming geometries are illustrated. With particular reference to FIG. 4A, the pore forming apparatus 30a includes a plurality of the pins 34 formed into a plurality of rows $42_1$ to $42_n$. An opening 44 is left in the pattern such that pores will not be formed in a selected area of the laminate 10. The open area 44 may be any appropriate shape or size and may used for forming an opening or hole in the laminate 10. Particularly, if there is an opening for a rod or tube, no pores would be formed therein.

With particular reference to FIG. 4B, the pore forming apparatus 30b includes a first set of pins 46 having a first diameter X and a second set of pins 48 having a second diameter Y. The first diameter X may be any diameter different, yet appropriate, than the diameter Y. Therefore, the laminate 10 will have pores formed therein that include pores of various sizes. This may be desirable especially if the laminate 10 is to be used cover to adjacent sections requiring a different size pore in each section. This technique may also be used to vary the transportation of material across the laminate 10.

With particular reference to FIG. 4C, a pore forming apparatus 30c includes a first section of pins 50 and a second section of pins 52. The first section pins 50 may be formed in a particular pattern, such as a triangle for forming pores in the laminate 10 in the selected pattern. Moreover, the pins in the first section 50 include a first density which is different than the density of the pins in the second section 52. Furthermore, the shape or general pattern of the second set of pins 52 may differ from to the first set of pins 50. Further, the pins 52 may be set at any angle for the intended creation of pores which traverse the laminate at the angle relative to the laminate surface 12a or 14a (See FIG. 1). Therefore, several different pore forming apparatus can be produced to provide various different porosities, pore sizes, pore shapes or pore patterns. In this way the laminate 10 may include a porosity of any selected manner.

The laminate structure 10 can be formed according to any appropriate method. Depending upon the material from which the laminate structure 10 is formed, the method for selectively forming the pores 20 in the laminate structure 10 may vary. Moreover, the layers 12, 14 of the laminated structure 10, which are first placed adjacent one another in the preform 40, may be substantially non-porous. Thus, substantially all pores formed in the laminated structure 10 would be through the removal of the pore forming members 32 from the laminated structure 10 after the laminate preform 40 had been laminated.

Various methods include, forming selected pores in a non-oxide material may require specific etching or non-oxide melting methods. For example, forming selected pores in the laminate structure 10 when the laminate structure 10 is formed of a non-oxide material is disclosed in U.S. patent application Ser. No. 10/624,905 entitled "Method and Apparatus For Processing Non-Oxide Selectively Porous Materials", to Miklos Paul Petervary and Min Zhou Berbon, and commonly assigned. It will be understood, however, that any appropriate method may be used for forming the laminate structure 10 that includes the selected pores 20 for use according to various embodiments of the invention.

Figure 5:
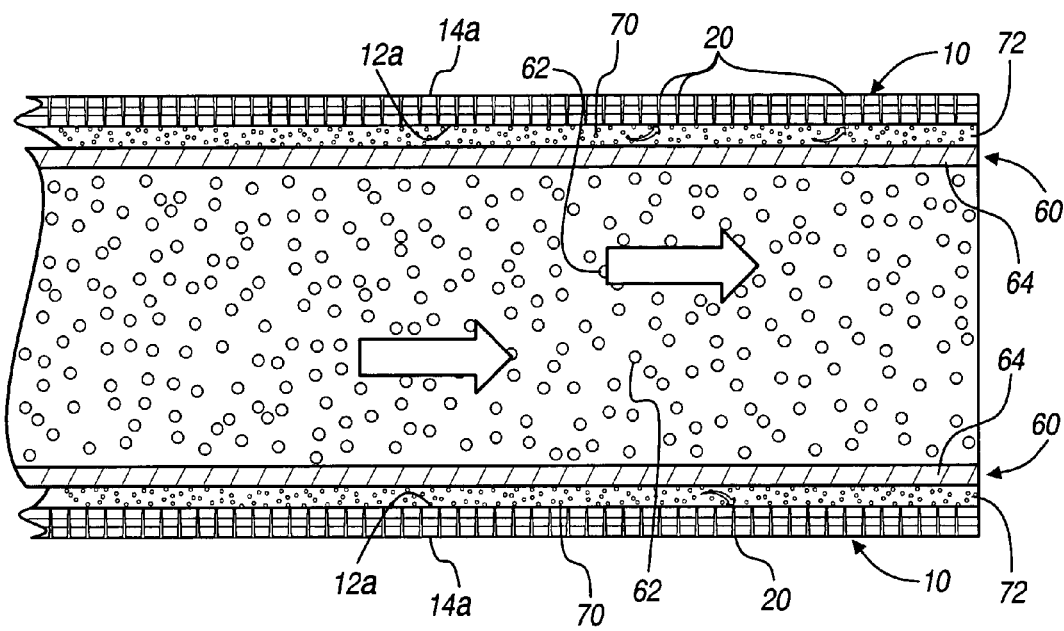
FIG. 5 is a diagram of a transpiration cooling system according to an embodiment of the invention.

With reference to FIG. 5, a transpiration cooling system 56, for use in various applications, is illustrated. The transpiration cooling system 56 is intended for use with an apparatus or component 60 which is required to be cooled, although it will be appreciated that the apparatus 60 does not form a part of the system 56. The apparatus 60 may include any appropriate item such as a turbo pump or turbine for various applications, such as a rocket engine or turbine engine. It will also be understood that the apparatus 60 may include items such as the exterior of a turbine engine, for example an engine for an aircraft, and other appropriate apparatus which may produce or transport heat containing or producing items.

For example, the apparatus 60 may transport a heated fluid 62. As the heated fluid 62 is transported through the apparatus 60, a wall or exterior 64 of the apparatus may become heated due to a heat transfer or thermal energy transfer from the heated material 62 to the wall 64 The apparatus 60, however, is generally maintained at a selected temperature.

Positioned around the wall 64 of the apparatus 60 may be the laminate structure 10. The laminate structure 10 includes the plurality of pores 20 formed therein. The pores 20 are formed in the laminate structure 10 to have a selected physical property relative to the laminate structure 10 or another material. For example, a cooling or radiating material 70 may be provided in an area or cooling space 72 between the laminated structure 10 and the wall 64 of the structure 60. The cooling material 70 is provided from a cooling supply 73. The cooling material 70 may flow in the cooling area 72 and through the pores 20. Generally, the cooling material 70 would move from the first side 12a, or inside in this instance, to the second side 14a, or outside, of the laminate structure 10.

As the cooling material 70 moves from the first side 12a to the second side 14a, thermal energy is also moved from the cooling area 72 to the second side 14a of the laminate structure 10. As the cooling material 70 moves within the cooling space 72, it absorbs thermal energy from the wall 64 of the structure 60. Therefore, as the cooling material 70 moves away from the wall 64 thermal energy is also moved away from the wall 64. This cools the wall 64 and cools the apparatus 60. Generally, the passing of the cooling material 70 through the pores 20 of the laminate structure 10 is by the process of transpiration. More specifically, the cooling of or removal of thermal energy from the apparatus 60 is by transpiration cooling of the apparatus 60. Therefore, providing the laminate structure 10 with pores 20 and flowing the coolant material 70 such that it absorbs thermal energy and moves the thermal energy away from the apparatus 60 allows transpiration cooling. This allows the apparatus 60 to be maintained at a selected temperature.

Because the material 70 moves away from the structure 60, the structure 60 is able to maintain the transference of the material 62 through the structure 60. This allows the structure 60 to be formed of a material which is substantially less heat resistant than if the apparatus 60 were not cooled by the cooling material 70. Moreover, the structure 60 may be cooled by only providing the laminate structure 10 and the supply 73 of the cooling material 70.

The cooling material 70 flows through the cooling area 72 and through the pores 20 according to natural or inherent mechanisms. For example, the pores 20 may be formed in the laminate structure 10 to have a substantially uni-directional property. The pores 20, particularly the uni-directional pores 26, allow the coolant material 70 to move in only one direction relative to the laminate structure 10. That is, the uni-directional pores 26 allow the cooling material 70 to move from the cooling space 72 to the exterior 14*a* of the laminate structure 10 and not from the exterior of the laminate structure 14*a* to the cooling space 72. Thus, the transfer of thermal energy occurs in substantially only one direction. In addition, the pressure created within the cooling area 72, due to the heating of the cooling material 70, also assists in driving the cooling material 70 through the pores 20 of the laminate structure 10.

Due to the selected formation of the pores 20 within the laminate structure 10, selected amounts of cooling may occur around the structure 60. This allows for varying cooling rather than providing a substantially uniform cooling. Because the pores 20 are selectively formed in the laminate structure 10, the porosity, size, and direction of the pores 20 can be selected. Therefore, the single laminate structure 10 can include a plurality of regions to allow for varying degrees of cooling and transpiration. For example, a specific area of the apparatus 60 may need to be cooled more rapidly than another area of the apparatus 60. Therefore, a greater porosity or size of pores can be provided in that area of the laminate structure 10 relative to the apparatus 60. However, if less cooling is required in a different area a lesser porosity may be provided in favor of greater material density of the laminate structure 10 to allow for greater rigidity.

Uni-directional pores may also be used to transfer thermal energy from one area to another of the apparatus 60. In a first area, the laminate structure 10 may provide for a removal of heat from the apparatus 60 by moving the coolant material 70 from the cooling area 72 to the exterior 14*a* of the laminate structure 10 and further uni-directional pores allow for the coolant material 70 to move from the exterior 14*a* to the coolant area 72. Therefore, thermal energy may be transferred from one area to another thereby allowing cooling of one region and heating of another region of the apparatus 60. Nevertheless, the plurality of pores 20 in a laminate structure 10 can be formed for any selected properties or structure.

In addition, because the pores 20 are formed within the laminate structure 10 during a processing step, the laminate structure 10 can include any selected physical property. For example, the laminate structure 10 may include a selected tensile strength such that the laminate structure 10 may be included as a structural component of the apparatus 60. Therefore, rather than simply providing a cooling mechanism for cooling the structure 60, the laminate structure 10 may also be provided as a structural component of the apparatus 60.

Moreover, because the laminate structure 10 can be selected of various materials, the materials which form the laminate structure 10 can be selected to withstand any environment in which the apparatus 60 is placed. Therefore, if the cooling system 56 is positioned within a rocket engine, which may reach high temperatures, the material of the laminate structure 10 can be selected to withstand such high temperatures. For example, the laminate structure 10 can be formed of an oxide, substantially a ceramic, which includes various laminated oxide layers that may withstand extremely high temperatures. Also, because the laminate structure 10 is formed of a plurality of layers 12, 14 that are laminated together, the laminated structure 10 includes inherent strengths. Moreover, the various layers can be chosen to provide even greater strengths or other physical properties. These strengths are maintained or enhanced in part because the pore-forming members 34 are positioned in the laminate preform 40 before the laminate structure 10 is formed. Therefore, the final laminate structure 10 includes selected properties that are uninhibited by the inclusion of the plurality of pores 20.

It will be understood that the laminate structure 10 can be used in the cooling system 56 for cooling the selected apparatus 60. It will be understood that the structure 60 may be any appropriate structure which is required to be cooled and can be cooled with transpiration cooling. Furthermore, it will be understood that the cooling material 70 may be any appropriate cooling material which can be provided in the cooling area 72. It will also be understood that the laminate structure 10 can be provided in any appropriate shape to create the cooling area 72 around the apparatus 60. For example, the apparatus 60 may be substantially cylindrical, therefore the laminate material may be provided in a substantially cylindrical shape to surround the apparatus 60. Furthermore, the apparatus 60 may include irregularities in the wall 64 which can also be mirrored in the shape of the laminate structure 10.

Figure 6:
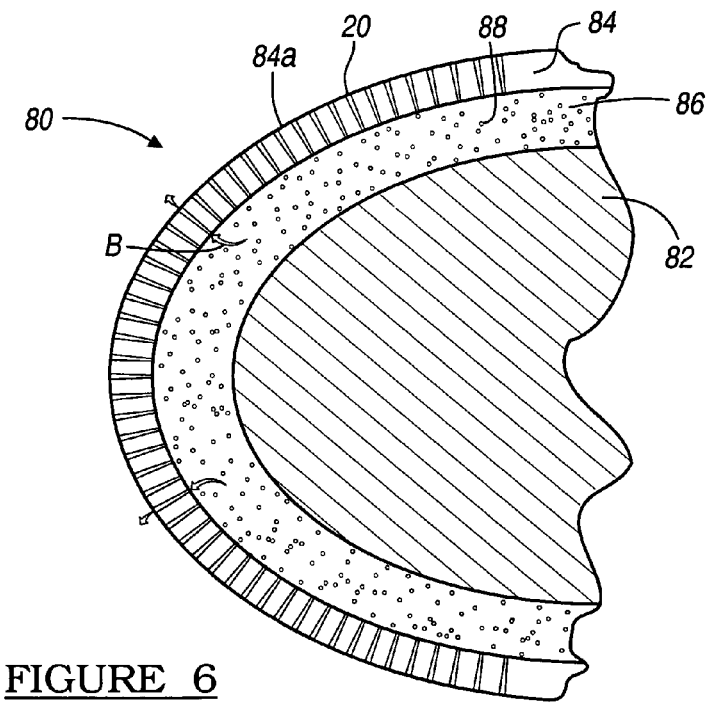
FIG. 6 is a detailed cross-sectional view of a leading edge of an airfoil according to an embodiment of the invention.

With reference to FIG. 6, an apparatus to be cooled may include a turbine fan or fin, or particularly a leading edge apparatus 80 of any appropriate system such as a turbine blade or a leading edge of a plane wing for a vehicle which may be heated due to frictional air forces. Therefore, the edge fin 80, is exemplary of any of these systems which include the leading edge 80 that may become heated due to frictional forces. Generally, an internal or structural component 82 provides an internal support for the edge 80. An external surface or skin 84 of the fin edge 80 is formed of a porous material. A plurality of the pores 20 are selectively positioned along the fin edge 80. The pores 20 are formed in the skin 84 of the fin edge 80 using the above-described methods. During the formation process, the skin 84 may be formed into any appropriate shape, such as the leading edge of the fin edge 80. Moreover, the skin 84 may be formed as a leading edge of a wing for an aircraft and may include the appropriate aerodynamic properties. Nevertheless, the skin 84 may be formed of the ceramic materials, including oxides and non-oxides, that include appropriate or selected strength, environmental compatibility, and heat resistant properties.

During use, especially when the skin 84 is heated due to frictional or other forces, the skin 84 may be cooled through transpiration. If the blade 80 is a blade of a turbine fan as it spins aerodynamic frictional forces increase the temperature of the leading edge 80 or the surface 84a of the skin 84. If the blade 80 is exemplary leading edge of a wing of an aircraft, it will increase in temperature during flight, such as re-entry of a spacecraft. Nevertheless, the skin 84 is spaced a distance from the internal structure 82 thus forming a coolant pathway 86. In the coolant pathway 86 is flowed a coolant 88. The coolant 88 flows through the pores 20 in the direction of arrow B. That is, the coolant 88 flows from the coolant pathway 86 to an exterior 84a of the skin 84. As the coolant 88 reaches the exterior of skin 84a, heat is removed from the skin 84 through various means.

The coolant 88, as it flows through the pores 20, can remove thermal energy from the skin 84 according to various methods. For example, as the coolant 88 flows through the exterior of 84a, of the skin 84, the coolant 88 may change phase, such as vaporizing thus turning from a liquid to a gas. This phase change cools the skin 84 and using some of the thermal energy on the exterior 84a of the skin 84 thereby cooling the skin 84. In addition, sheer forces of the hot gases flowing around the exterior 84a of the skin 84 removes a volume of the coolant 88 as it flows through the pores 20. Moreover, the coolant 88 is substantially constantly flowing through the pores 20 producing a film or coating on the exterior 84a of the skin 84. The film of the coolant 88 also helps ensure that the skin 84 maintains a selected temperature Therefore, the skin 84 including the pores 20, formed as described allows for transpiration cooling of the blade 80. The coolant 88 removes thermal energy from the skin 84 according to any appropriate or physically possible method. Nevertheless, this transpiration of the coolant 88 through the pores 20 allows the coolant 88 to cool the skin 84. Thus, the skin 84 can be kept at a selected temperature that does not compromise various properties of the skin 84, such as strength or toughness. Moreover, the pores 20 formed in the skin 84 provide a substantially efficient method of cooling the skin 84 without providing substantially complex circuitry and cooling systems.

Figure 7:
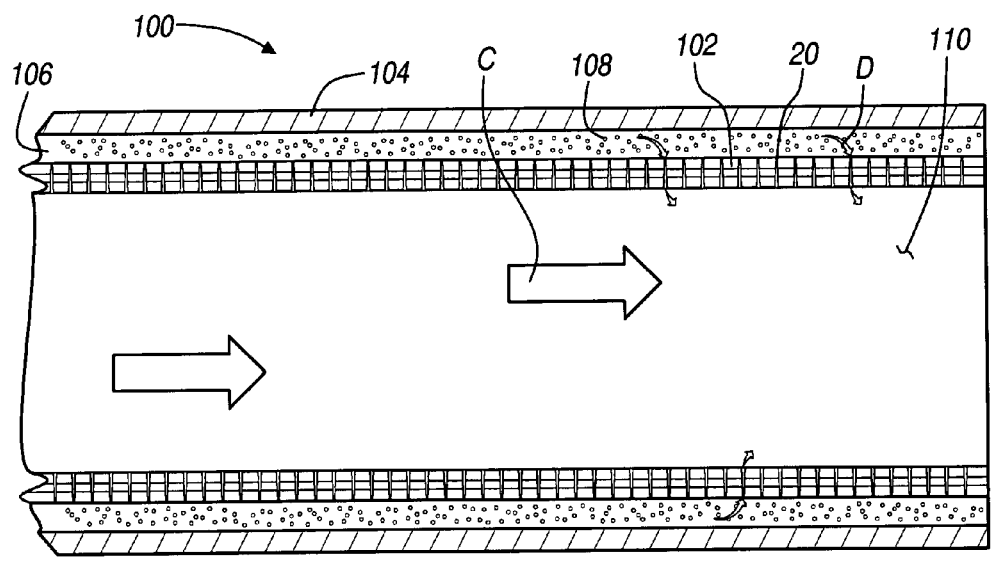
FIG. 7 is a cross-sectional detailed view of a nozzle including an embodiment of the present invention.

With reference to FIG. 7, an apparatus 100 includes the pores 20 formed in a wall 102 as a structural component of a apparatus or device 100 subject to high heat fluxes. Generally, the heat fluxes may be formed by the flowing of hot gases or a flame, such as in a combustion chamber or in a nozzle of a rocket engine or the like. For example, hot gases may flow in the direction of arrow C within the wall 102 that includes a plurality of the pores 20 formed therein. Formed on an exterior of the walls 102 is an external or cooling plenum wall 104. Space between the plenum wall 104 and the wall 102 of the apparatus is a cooling space or conduit 106.

Through the cooling conduit 106 flows a coolant 108 that is able to flow through the pores 20 into the heated area or a flow chamber 110. The gases flowing in the direction of arrow C flow through the flow chamber 110 and substantially heat the walls 102. Nevertheless, the coolant 108 flows through the pores 20 in the direction of arrow D to substantially cool the wall 102 to a selected temperature. As the coolant 108 flows through the pores 20, it can change phases or cause a film to form on the interior of the wall 102. As discussed above, a change in phase of the coolant 108 removes thermal energy from the wall 102 and allows it to be maintained at the selected temperature. In addition, the sheer forces on the film, which forms on the interior of the wall 102, helps cool the wall 102 as the hot gases flow past the direction of arrow C. Any cooling method using the coolant 108 may be used to cool the wall 102. Nevertheless, the wall 102 can be cooled by flowing the coolant 108 through the pores 20. The only structure that is provided is the cooling plenum wall 104 to hold the coolant 108 relative to the hot wall 102.

Although the porous material has been illustrated to be a high heat flux hot wall of the turbine fan 80 or a rocket thruster nozzle 102, it will be understood that the porous material may be used in any appropriate application. The porous material allows the coolant to flow from a supply area or conduit through the porous material to the hot wall side of the porous material. There the coolant may change phase or form a cooling film relative to the hot wall. This allows the hot wall to be maintained at a selected temperature while it surrounds an area of substantially high heat flux. For example, using the oxide and non-oxide ceramics, as discussed above, the porous materials may be used to cool areas and manage applications or designs having a heat flux beyond the capability of an actively cooled metal solution. Therefore, the porous ceramic matrix laminates can be used to contain substantially higher temperature higher heat flux reactions than presently available.

Moreover, forming the porous laminated structures with the pin method, as described above, allows of the laminate structures to substantially maintain the physical properties of the laminate structure. Therefore, the selected porous properties can be formed in the laminate materials without sacrificing the physical characteristics of the laminate material, such as strength or toughness.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of cooling an apparatus, having a surface, with a coolant and a porous member, the method comprising:
   providing a porous member including:
      selecting a substantially non-porous laminate preform;
      laminating said laminate preform to form a laminated structure with a pore forming member disposed therein;
      removing said pore forming member to form a selected pore;
   forming a coolant flow area near at least a portion of said surface, including positioning the porous member a distance from said portion of said surface of said apparatus;
   flowing the coolant through said coolant flow area; and
   transporting a portion of said coolant through said porous member.

2. The method of claim 1, further comprising:
   selecting a coolant to flow in said coolant flow area;
   wherein said coolant is able to absorb thermal energy from the apparatus.

3. The method of claim 1, further comprising:
   selecting a coolant able to transpire through a pore of the porous member.

4. The method of claim 1, wherein transporting a portion of said coolant through said porous member includes transpiring a portion of said fluid through a pore of said porous member; and
   wherein said transpiration cools, the apparatus.

5. The method of claim 1, wherein flowing the coolant through the coolant flow area allows the coolant to absorb thermal energy from the apparatus;
   wherein transporting the coolant through the porous material includes:
      transpiring said coolant including absorbed thermal energy through a pore of said porous member; and
      cooling the apparatus when said coolant material is transpired through said pore.

6. The method of claim 1, wherein forming a coolant flow area includes:
   selecting said distance to allow the coolant to flow through said coolant flow area; and
   wherein said distance allows the coolant to absorb a portion of thermal energy from the apparatus and move it to an outside of said porous member.

7. The method of claim 6, wherein said porous member includes an inside and said outside wherein said inside is nearer said exterior of the apparatus than said outside of said porous member; and
   wherein said portion of said coolant is transported from said inside to said outside of said porous member.

8. A transpirationally cooled apparatus, comprising:
   a member for providing a support; and
   a skin surrounding said member including a first side and a second side;
   wherein said skin is spaced a distance from said member to define a coolant conduit;
   wherein said skin defines a pore extending between said first side and said second side;
   wherein a coolant disposed in said coolant conduit is able to move through said pores;
   wherein said skin is formed of composite materials including a reinforcement fiber extending through said skin.

9. The transpirationally cooled apparatus of claim 8, wherein said skin generally defines a leading edge of a structure.

10. The transpirationally cooled apparatus of claim 9, wherein said structure is selected from a leading edge of a turbine fan, a leading edge of a propeller, a leading edge of an impeller, a leading edge of a wing, a leading edge of an aircraft, and combinations thereof.

11. The transpirationally cooled apparatus of claim 8,
   wherein said pores are formed in said skin without substantially damaging said reinforcing fiber.

12. The transpirationally cooled apparatus of claim 8, further comprising:
   a coolant pressurizing system, including a coolant source, and an apparatus for providing said coolant through said coolant conduit at a pressure greater than a pressure on at least one of said first side and said second side of said skin;
   wherein said coolant flows from said coolant conduit to a side of said skin opposite said coolant conduit.

13. The transpirationally cooled apparatus of claim 8, wherein said coolant removes thermal energy from said skin to maintain said skin at a selected temperature.

14. A transpirationally cooled apparatus, comprising:
   a member for providing a support; and
   a skin surrounding said member including a first side and a second side;
   wherein said skin is spaced a distance from said member to define a coolant conduit;
   wherein said skin defines a pore extending between said first side and said second side;
   wherein a coolant disposed in said coolant conduit is able to move through said pores;
   wherein said skin is formed of a material including ceramic matrix composites.

15. A transpirationally cooled apparatus, comprising:
   a member for providing a support; and
   a skin surrounding said member including a first side and a second side;
   wherein said skin is spaced a distance from said member to define a coolant conduit;
   wherein said skin defines a pore extending between said first side and said second side;
   wherein a coolant disposed in said coolant conduit is able to move through said pores;
   wherein said skin includes:
   forming a laminate preform of selected layers;
   positioning pore forming members through said layers in a selected orientation and number;
   processing said laminate preform to substantially fix each of said selected layers relative said each other of selected layers; and
   removing said pore forming members to leave said pores in said skin.

16. A method of cooling a structure, comprising:
   forming a selected pore having a structure to allow only a substantially unidirectional flow of a coolant;
   disposing said structure relative to a heat flux such that a portion of said structure is able to be heated; and
   moving the coolant through said pores to maintain said structure at a selected temperature;
   wherein said selected temperature substantially maintains a selected property of said structure.

17. The method of claim 16, wherein:
   said structure includes an interior and an exterior;
   said interior is a hot wall to which said coolant is flowed.

18. The method of claim 17, wherein said coolant removes thermal energy from said structure as said coolant flows to said hot wall.

19. The method of claim 16, wherein maintaining said structure at a selected temperature includes:
   cooling said structure;
   wherein cooling said structure includes removing thermal energy from said structure with said coolant.

20. The method of claim 19, wherein removing thermal energy from the structure is selected from a phase change of the coolant, sheer forces removing the coolant, or combinations thereof.

21. The method of claim 20, wherein said selected property is selected from a size, a shape, a directionality, and combinations thereof.

22. The method of claim 16, wherein forming a selected pore in a structure includes forming pores with selected properties including allowing a substantially one directional flow of the coolant.

23. A method of cooling a structure, comprising:
   forming a selected pore in a structure, comprising;
      providing a laminated preform including a plurality of layers positioned substantially adjacent one another;

disposing a pore forming member in a selected plurality of said plurality of layers;

processing said laminated preform to substantially fix said plurality of layers relative one another; and removing said pore forming members to provide said selected pore disposing said structure relative to a heat flux such that a portion of said structure is able to be heated; and moving a coolant through said pores to maintain said structure at a selected temperature;

wherein said selected temperature substantially maintains a selected property of said structure.

* * * * *